Dec. 5, 1967            JAMES E. WEBB            3,357,024
ADMINISTRATOR OF THE NATIONAL AERONAUTICS
AND SPACE ADMINISTRATION
METHOD OF RECORDING A GAS FLOW PATTERN
Filed Jan. 20, 1966

INVENTOR.
TREVOR T. MORDECAI

BY

ATTORNEYS

3,357,024
METHOD OF RECORDING A GAS FLOW PATTERN
James E. Webb, Administrator of the National Aeronautics and Space Administration, with respect to an invention of Trevor T. Mordecai, Madison, Ala.
Filed Jan. 20, 1966, Ser. No. 521,999
8 Claims. (Cl. 346—1)

ABSTRACT OF THE DISCLOSURE

A method of observing and recording the flow pattern patern made by a gas moving within a narrow space such as the lubrication gap of a gas bearing. A thin film of oil of a special type to give color contrast is applied to the surface of a component (such as a gas bearing component) over which gas is to pass as it flows through a narrow passage. The component is then assembled into the device under study and gas under normal operating pressure is passed through the gas flow passages of the device for an appropriate period of time after which the oil treated component is removed from the assembly and a color photograph is made of the oil covered surface over which the gas has flowed. The interference colors in the light reflected from the oil film will vary with the variations in the oil film distribution caused by forces exerted on the oil film by the gas flow. This distribution of the oil film corresponds to the flow pattern of the gas.

---

Figure 3:
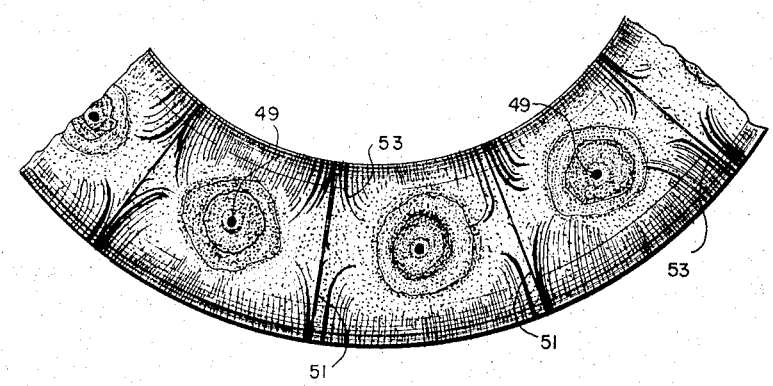

The invention described herein with made in the performance of work under a NASA contract and is subject to the provisions of Section 305 of the National Aeronautics and Space Act of 1958, Public Law 85–568 (72 Stat. 435; 42 U.S.C. 2457).

This invention relates to a method of observing and recording the flow pattern made by a gas moving within a narrow space.

A critical phase in the operation of certain devices in use today concerns the flow of a gas, such as oxygen or nitrogen, into and through very narrow spaces. One such device is the gas bearing wherein friction between adjacent surfaces of the bearing and the element supported by the bearing is substantially eliminated by passing gas between the adjacent surfaces. Although gas bearings are employed in ever-increasing functions, one of the most important applications is their use as gyro supporting bearings in the guidance systems of space vehicles.

Typically, a supporting element of a gas bearing, a plate, for example, will have a series of regularly spaced orifices through which gas supplied from a remote source under relatively low pressure is introduced making a very narrow space between the surface of the bearing plate and the surface of the component being supported by the bearing. The flow of gas is constant while the bearing is operating so that the gas continuously passes through and exits from the narrow space thus maintaining a thin friction-reducing film between the surfaces.

Inasmuch as a gas bearing is a very delicate and high precision device, its efficiency is affected by numerous factors including such things as manufacturing techniques, the size and arrangement of the orifices through which the gas passes, the type of filters used in the orifices and the pressure under which the air is distributed. It is known that these and other factors that affect the efficiency of gas bearings also influence the behavior of the gas as it moves between the surfaces of the bearing elements.

Since this gas behavior is directly related to the efficiency of a gas bearing and is responsive to many factors involved in the design of a bearing, an accurate and reliable way is needed for observing and recording a clear and detailed flow pattern of the gas as it flows between adjacent surfaces of a gas bearing assembly. Comparisons of detailed flow patterns of gas bearings of different design would be very valuable in efforts to develop more efficient gas bearings. For example, the change in a gas flow pattern resulting from a design change of a gas bearing would be an indication of the effect of the particular design change on the efficiency of the gas bearing.

In a prior method of observing and recording the gas flow pattern of gas bearings, the component to be supported by a gas bearing was coated with a film of oil on the surface area thereof that would be opposite and adjacent to the internal surface of the bearing when assembled therein. The bearing was then assembled and subjected to a prescribed inlet pressure of gas for a prescribed time period. The supported component was subsequently removed from the bearing assembly, and the surface having the oil film thereon was dusted with carbon black to bring out the highlights of the pattern formed in the oil film by the gas flow. The pattern was then photographed to obtain a permanent record.

This prior method of observing and recording gas flow patterns has a major drawback in that the details of the flow pattern are not adequately revealed by the dusting procedure and the photographs of the patterns highlighted by the carbon black dust are lacking in detail. Moreover, when applying the carbon black dust to the oil film it is difficult to avoid smearing or otherwise disturbing the oil film and the flow pattern formed therein. A further disadvantage of the dusting process is the requirement for a relatively thick and heavy film of oil to be applied to the component surface so that the dust will adhere to the film. This impairs the usefulness of the dusting procedure where close tolerances permit only an extremely narrow flow space because the thick and heavy oil film inhibits the flow of gas unduly.

According to the present invention, it has been found that a much clearer and more detailed view and record of the flow pattern of a gas through a narrow space can be obtained by a method involving the use of color photography. Briefly described, the method comprises applying a thin film of oil of a special type to give color contrast to a component surface over which gas is to pass as it flows through a narrow passage. The component is then assembled into the device under study (a gas bearing, for example) and gas under normal operating pressure is passed through the gas flow passages of the device for an appropriate period of time. Subsequently the oil treated component is removed from the assembly and a color photograph is made of the oil covered surface over which the gas has flowed. The interference colors in the light reflected from the oil film vary with the variations in the oil film distribution caused by forces exerted on the oil film by the gas flow. This distribution of the oil film corresponds to the flow pattern of the gas. Therefore, the color photograph of the oil film provides a vivid, accurate and detailed picture of the gas flow pattern while avoiding the dusting procedure and the attendant disadvantages pointed out previously. For best results, the oil treated surface is photographed while being indirectly lighted in a manner to prevent distortion and enhance the color pattern reflected from the oil film.

Accordingly, it is a general object of this invention to provide a better method of observing and recording the flow pattern made by a gas moving within and through a narrow passage.

More specifically it is an object of this invention to provide a simple and economical method of consistently obtaining an acurate and detailed picture of the flow pattern of a gas moving within a narrow passage.

A further object of this invention is to provide a method of obtaining a vivid and highly detailed color photograph showing the flow pattern of a gas moving over a pretreated surface.

Another object of this invention is to provide a method of treating and photographing a component so as to obtain a color photograph showing in detail the flow pattern made by a gas flowing over the surface of the component.

Figure 1:
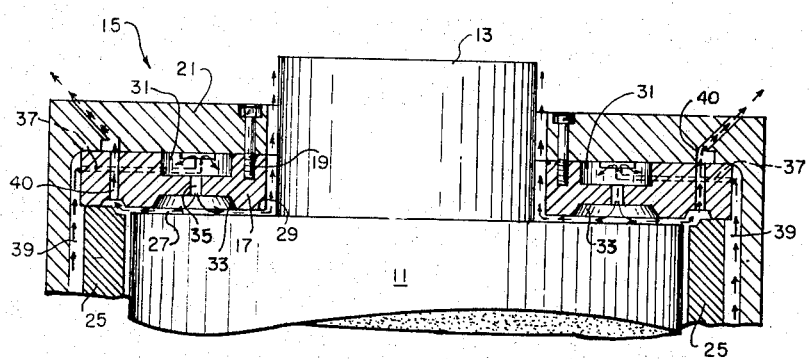
Figure 2:
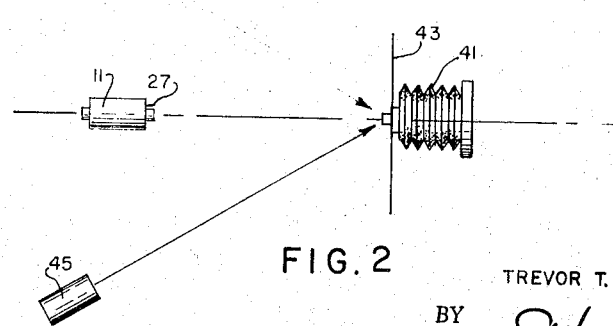

These and other objects and advantages of the invention will become more apparent upon reference to the following specification, appended claims and drawings, wherein;

FIGURE 1 is a fragmentary view of a cylindrical component supported within a gas bearing;

FIGURE 2 is a schematic view of a setup for making a color photograph of a flow pattern made by a gas moving over the end surface of the cylindrical component of FIGURE 1; and FIGURE 3 is a fragmentary view showing a segment of the end surface of the cylindrical component of FIGURE 1 and showing the outline of a gas flow pattern to illustrate, as nearly as practical in black and white, a photograph of a gas flow pattern made according to this invention.

Referring now to FIG. 1, 11 is a cylinder provided with an axial shaft 13 extending through an end assembly 15 of a gas bearing. By way of example, the cylinder 11 could be a gyro cover that is supported in the gas bearing. The end assembly 15 comprises an annular end plate 17 joined by screws 19 to a closure plate 21. The cylinder 11 is supported within a gas bearing sleeve 25.

Lubrication between an end surface 27 of the cylinder 11 and a bearing surface 29 of the end plate 17 is accomplished by introducing and maintaining a thin layer of gas such as oxygen or nitrogen between these surfaces. Each of the surfaces 27 and 29 are very smooth, being polished to a mirror-like finish. The end plate 17 has a series of circumferentially spaced air pockets 31 therein which are aligned with a series of shallow cavities 33 in the surface 29 of the end plate. Extending centrally between the respective air pockets 31 and cavities 33 are orifices 35. Each air pocket 31 receives gas through a passage 37 which communicates with a plenum feeder (not shown) through a channel 39. Each passage 37 for the respective air pockets 31 extends radially from the circumference of the plate 17 to a point between two air pockets 31 and then turns into the air pocket it serves. As indicated by the arrows in FIG. 1, the gas flow from channel 39 through passages 37 and orifices 35 into the cavities 33. From the cavities 33 the gas passes between the surfaces 27 and 29 of the cylinder 11 and the end plate 17, respectively, and acts as a friction-reducing film between these surfaces. The gas escapes between the end plate 17 and the shaft 13 ad through escape passages 40 extending through end plate 17 and the closure plate 21.

As previously indicated, the behavior of the gas between the adjacent surfaces is directly related to the efficiency of the gas bearing. Therefore, in the work of designing and developing more efficient gas bearings it is very desirable to observe and record a detailed flow pattern made by the gas as it passes between the surfaces of components such as the end plate 17 and the cylinder 11. A method of obtaining such a gas flow pattern according to this invention will now be described.

Before the cylinder 11 is assembled in the gas bearing the end surface 27 thereof is coated with a thin liquid film, preferably a film of a phosphorescent oil containing an acetic acid short stop solution to act as a rather mild drying agent. It is understood that in practice both ends of the cylinder 11 would be supported by a gas bearing end plate and both end surfaces would be coated with oil in order to obtain the flow pattern simultaneously at each end.

After oil has been applied to the end surface thereof, the cylinder 11 is assembled in the gas bearing and gas is applied to the bearing under an inlet pressure of about 15 p.s.i.g. for 10 to 15 minutes. During this time the film of oil on the end of the cylinder is subjected to forces exerted by the gas flow and is redistributed so as to correspond to the gas flow pattern. The cylinder 11 is then removed from the gas bearing and mounted in a stand with the end surface 27 directly facing a camera 41 and a longitudinal axis of the cylinder being in alignment with the camera lens as indicated in FIG. 2. This position of the cylinder relative to the camera avoids parallax distortion of the flow pattern revealed in the photograph.

In making the color photograph with the end surface 27 directly facing the camera as described above, it has been found that best results are obtained by indirectly lighting the end surface in the manner illustrated in FIG. 2. Thus a light reflector 43 which may be made of a sheet of heavy white paper is placed in front of the camera 41 with the lens of the camera protruding through a hole in the center of the reflector. The reflector is evenly illuminated by photogaphic lights 45 that illuminate the reflector but do not illuminate the cylinder surface 27. The light reflected from the reflector 43 illuminates the highly reflective surface 27 and the oil film thereon which has the gas flow pattern formed therein. The light reflected from the oil film into the eye of the camera emits various interference colors that vary in relation to the gas flow pattern formed in the oil film, and the resulting photograph provides a colorfully detailed view and record of the gas flow pattern.

FIG. 3 represents a segment of the end surface of a cylinder such as the cylinder 11, and shows a gas flow pattern. It is understood that the black and white variations that outline the flow pattern in FIG. 3 would be delineated in various colors in a color photograph made according to this invention, thus providing a clear and detailed view of the gas flow pattern.

The gas flow pattern of FIG. 3 shows well defined spots 49 where the lubricating gas impinged on the end surface of the cylinder after passing through the orifices 35 in the air bearing end plate 17. The areas within which the gas flowed from the respective orifices are defined by the regularly spaced radial lines 51 and as an example of the significance of a gas flow pattern, if these areas were not equal it could be an indication of a clogged or poorly made orifice. The flow behavior of the gas outwardly from the spots 49 is indicated by numerous lines such as 53 which curve from the vicinity of the spots 49 toward the inner and outer surfaces of the cylinder.

Pictures of gas flow patterns obtained according to this invention affords thorough analysis, including comparisons and interpretations, of flow patterns, and the relationship of the flow patterns to the efficiency of a given device under study. While the invention has been described in a specific application to a gas bearing, it is understood that the inventive method is applicable to the study of gas flow in other devices wherein gas flow through narrow spaces needs to be investigated.

Obviously, many modifications and variations of the present invention are possible in light of the above teachings. It is, therefore, to be understood that within the scope of the appended claims the invention may be practiced other than as specifically described.

What is claimed is:

1. A method of recording a flow pattern of gas moving in a narrow space comprising:
   (a) applying a film of liquid to a surface over which gas is to flow while moving in said narrow space;
   (b) moving gas in said space whereby the movement of said gas forms a pattern in said liquid film;
   (c) making a color photograph of said surface with the patterned liquid film thereon.

2. The method of claim 1 wherein said liquid comprises an oil.

3. The method of claim 2 wherein said oil is a phosphorescent oil and contains a drying agent.

4. The method of claim 1 wherein the making of said photograph includes the steps of positioning a reflector substantially parallel to and facing said surface, illuminating said reflector with an artificial light source removed from said reflector, and illuminating said surface with artificial light reflected from said reflector.

5. The method of claim 1 wherein said surface on which said liquid film is applied is a planar, light reflecting surface.

6. The method of claim 1 wherein said surface comprises one of two opposite surfaces of a gas bearing assembly, said narrow space being between said opposite surfaces, and said gas being a friction reducer between said opposite surfaces.

7. The method of claim 6 wherein said surface comprising one of said opposite surfaces comprises an end surface of a cylinder supported in said gas bearing assembly, and wherein said film of liquid is applied to said surface prior to installing said cylinder in said gas bearing assembly.

8. The method of claim 6 wherein said gas is introduced into said narrow space through an orifice in an element of said gas bearing.

References Cited
UNITED STATES PATENTS

| | | | |
|---|---|---|---|
| 1,711,347 | 4/1929 | Harter | 346—107 X |
| 3,301,046 | 1/1967 | Rubert et al. | 73—147 |

STEPHEN J. TOMSKY, *Primary Examiner.*

RICHARD B. WILKINSON, *Examiner.*

J. W. HARTARY, *Assistant Examiner.*